United States Patent [19]

White

[11] 3,867,614

[45] Feb. 18, 1975

[54] PROGRAMMABLE DIVIDER FOR COMBINED COUNTER AND TIMER

[75] Inventor: Robert R. White, Bettendorf, Iowa

[73] Assignee: Gulf & Western Industries, Inc., New York, N.Y.

[22] Filed: May 9, 1972

[21] Appl. No.: 251,775

[52] U.S. Cl. ........... 235/92 T, 58/23 A, 235/92 PL, 235/92 R, 328/48

[51] Int. Cl. ........................................... H03k 21/06

[58] Field of Search .......... 235/92 T, 92 PE, 92 PL; 324/186; 58/23 A, 23 AC, 24 A; 328/30, 32, 48

[56] References Cited

UNITED STATES PATENTS

| | | | |
|---|---|---|---|
| 2,500,581 | 3/1950 | Seeley | 328/30 |
| 2,598,491 | 5/1952 | Bergfors | 328/32 X |
| 2,978,642 | 4/1961 | Papineau | 328/32 X |
| 3,020,749 | 2/1962 | Cropper et al. | 235/92 T |
| 3,209,130 | 9/1965 | Schmidt | 235/92 PL |

*Primary Examiner*—Paul J. Henon
*Assistant Examiner*—Joseph M. Thesz, Jr.

[57] ABSTRACT

In a digital timer there is provided a programmable divider for converting a clocking signal into a selected one of several finite driving signals for a binary counter which counts pulses of the driving signal until a preselected number has been reached. Also provided is an arrangement for converting a 60 cycles per second clocking signal into a 100 cycles per second driving signal for introduction into a binary counter of a digital timer.

5 Claims, 7 Drawing Figures

(TRUTH TABLE)

| $\bar{A}$ | $\bar{B}$ | $\bar{C}$ | $\bar{A}\bar{B}$ | $\bar{A}\bar{B}+\bar{C}$ | $\overline{\bar{A}\bar{B}+\bar{C}}$ |
|---|---|---|---|---|---|
| 0 | 0 | 0 | 0 | 0 | 1 |
| 1 | 0 | 0 | 0 | 0 | 1 |
| 0 | 1 | 0 | 0 | 0 | 1 |
| 1 | 1 | 0 | 1 | 1 | 0 |
| 0 | 0 | 1 | 0 | 1 | 0 |
| 1 | 0 | 1 | 0 | 1 | 0 |
| 0 | 1 | 1 | 0 | 1 | 0 |
| 1 | 1 | 1 | 1 | 1 | 0 |

BINARY COUNT

| NO. | (A6Q) A | (A7Q) B | (A8Q) C | ($A6\bar{Q}$) $\bar{A}$ | ($A7\bar{Q}$) $\bar{B}$ | ($A8\bar{Q}$) $\bar{C}$ | $\overline{\bar{A}\bar{B}+\bar{C}}$ | |
|---|---|---|---|---|---|---|---|---|
| 0 | 0 | 0 | 0 | 1 | 1 | 1 | 0 | |
| 1 | 1 | 0 | 0 | 0 | 1 | 1 | 0 | |
| 2 | 0 | 1 | 0 | 1 | 0 | 1 | 0 | |
| 3 | 1 | 1 | 0 | 0 | 0 | 1 | 0 | |
| 4 | 0 | 0 | 1 | 1 | 1 | 0 | 0 | |
| 5 | 1 | 0 | 1 | 0 | 1 | 0 | 1 | BLOCK |
| 6 | 0 | 1 | 1 | 1 | 0 | 0 | 1 | RESET |

PROGRAMMABLE DIVIDER FOR COMBINED COUNTER AND TIMER

This invention relates to the art of electronic timers and/or counters of the digital type and more particularly to a programmable divider for use in a binary counter of a digital timer or a combined timer/counter.

The invention is particularly applicable for use as a combined timer/counter for industrial timing and counting applications, and it will be described with particular reference thereto; however, it is appreciated that the invention is equally applicable to a timer or counter separately and for various applications.

Some time ago, it was common practice to provide mechanical timers for use in industrial timing applications. These timers were generally quite reliable; however, they were somewhat expensive, somewhat large, and presented a certain amount of inaccuracy. In addition, mechanical timers could not accurately measure and read time in one/hundreths of a second, which is required in certain installations. Consequently, there has been a substantial amount of development work on electronic timers using charging circuits and various complementary circuitry. These timers, with the advent of solid state technology, has been converted into relatively small packaged timer units; however, they were analog in nature and lacked certain accuracy especially for small time intervals. In view of this, there has been a substantial amount of work on binary counters for use as timing devices, wherein a clocking pulse having a known frequency is directed into a multistage binary counter. This arrangement provides a digital readout having the number of digits generally corresponding to the stages within the binary counter. Since the frequency of the clocking signal is known and is constant, the digital readout from the binary counter is displayed in actual time. The same type of circuitry can be employed for a digital counter wherein the clocking signal is replaced by a signal having pulses to be counted. The operation of the circuit remains substantially identical in this counting mode with the displayed digit being in pulses counted. In such digital units, when acting as a timer, it is generally desirable to provide a fixed frequency clocking signal. To change the range of the timer, the clocking signal must be converted into various driving frequencies for the binary counter. For instance, if the clocking signal is created by an oscillator and has a frequency of 1,000 cycles per second, a divider stage to divide the clocking signal by 10 is necessary to create a timer having a least significant digit corresponding to 0.01 seconds. In a like manner, the clocking signal can be divided further by 10 to obtain a driving signal for the binary counter having a frequency of 10 cycles per second. This provides the least significant digits with a reading of 0.1 seconds. A further division by 10 provides the least significant digit of 1.0 seconds. This type of arrangement is not easily adapted for use on normal line currents where the clocking signal would be a 60 cycle frequency signal. Several stages would be required to convert the 60 cycle frequency into 100 cycles per second. The normal manner for accomplishing this would be to multiply the incoming frequency by five and then divide the resulting frequency of 600 cycles per second by six. As is well known, circuits for multiplying frequencies are quite complex and require a relatively large number of components which are not economically feasible in the industrial timer market.

The present invention relates to a digital timer, counter or combined timer/counter which includes a programmable frequency divider at the input stage of the normal multiple stage binary counter, which programmable divider can perform various conversions with relatively simple circuitry by a relatively simple, manually adjustable arrangement on the timer itself.

In accordance with the present invention, there is provided a timer operated by a 60 cycles per second clocking signal and comprising means for rectifying the clocking signal to produce a 120 cycles per second pulsating input signal, means for blocking one pulse out of six in the input signal to produce a pulsating driving signal having an average frequency of 100 cycles per second, a binary counter means connected to the output of the blocking means for counting the pulses in the driving signal and means for detecting when the binary counter means has counted a preselected number of pulses.

In accordance with another aspect of the present invention, there is provided an electric timer operated by a 60 cycles per second clocking signal which timer includes a converting means for selectively converting the clocking signal to one of several driving signals having diverse frequencies, terminals on the timer itself for producing logic 1 and logic 0 and means associated with these terminals for controlling the frequency of the signal issuing from the converting means. This output signal from the converting means is then directed to a binary counter having means for indicating when a certain selected number of pulses have been counted. By employing this aspect of the invention, the range of the counter is changed by simply changing conductors to the logic terminals. This provides a greatly simplified structure for changing the range of an electronic timer for industrial use.

The primary object of the present invention is the provision of an electronic timer, counter or combination timer/counter which employs an improved frequency dividing arrangement between the input clocking signal and the driving signal for the binary counter.

Another object of the invention is the provision of an electronic timer, counter or combination timer/counter which is compact, relatively inexpensive, and can be programmed for different timing and counting functions by a simple manual operation.

Still a further object of the present invention is the provision of an electronic timer, counter or combination timer/counter which employs a circuit for passing five out of six pulses in a 120 cycles per second clocking signal to produce a binary counter driving signal having an average frequency of 100 cycles per second.

These and other objects and advantages will become apparent from the following description taken together with the accompanying drawings in which.

Figure 1:
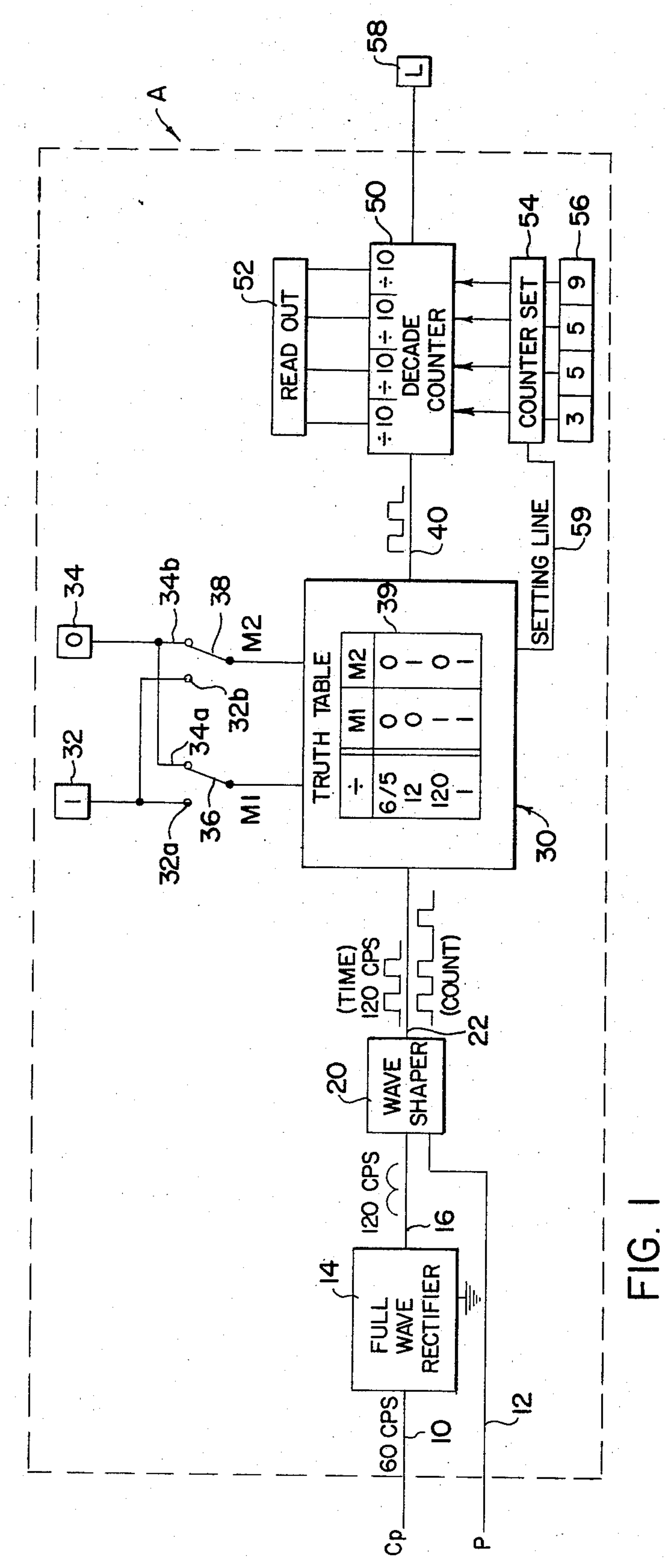
FIG. 1 is a schematic block diagram illustrating, generally, a timer, counter or combined timer/counter utilizing the present invention.

Referring now to the drawings wherein the showings are for the purpose of illustrating a preferred embodiment of the invention only and not for the purpose of limiting same, FIG. 1 shows a combined timer/counter A which is constructed as a unit and include a plurality of components. The dashed lines define the boundaries of unit A itself, and the components within the dashed lines are mounted on a unitary structure. When operating as a timer, a clocking signal, $C_P$ is introduced through line 10. This signal has the normal frequency of 60 cycles per second. When the unit A is operating as a counter, a pulsating signal P is introduced through line 12. It is appreciated that lines 10, 12 are alternately used in the operation of the combined timer/counter unit A. A full wave rectifier 14 rectifies the clocking signal $C_P$ into an input signal having 120 cycles per second at line 16 which is connected to an appropriate wave shaper 20. The wave shaper provides a clocking signal formed of essentially square pulses and appearing at outlet line 22. This clocking signal has a pulsing frequency of 120 cycles per second. Referring now to the pulse input P in line 12, it is also directed to the wave shaper 20 to produce a pulsing input signal having random pulses as shwon in FIG. 1. Line 22, which carries either the 120 cycles per second clocking signal or the pulses to be counted, is connected to the input of a programmable divider 30 which is constructed in accordance with the present invention. Programmable divider 30 is controlled by program terminals M1, M2 which are adapted to be connected in coded arrangements with coded terminals connected to a source 32 of logic 1 and a source 34 of logic 0. In accordance with the preferred embodiment of the invention, logic 1 is approximately zero volts and logic 0 is approximately −12 volts. The terminals include contacts 32*a*, 32*b* connected to source 32 having a logic 1, and terminals 34*a*, 34*b* are connected to source 34 having logic 0. Connectors 36, 38 are coupled onto program terminals M1, M2, respectively, for coded coupling with the sources 32, 34. Consequently, terminals M1, M2 may be connected either to logic 1 or logic 0. The particular arrangement of the program terminals M1, M2 changes the frequency conversion through the divider 30. The truth table 39 superimposed on divider 30 indicates the frequency conversion in the divider with various connections of the program terminals M1, M2. With the terminals both connected to logic 0 (source 34) the divider 30 divides the input signal in line 22 by 6/5. This results in a multiplication of the 120 cycles per second input signal by 5/6 to produce 100 cycles per second at output 40 for the programmable divider 30. In a like manner, if program terminals M1, M2 are connected to logic 0 (source 34) and logic 1 (source 32), respectively, the input signal in line 22 is divided by 12. This produces an output driving signal in line 40 having a frequency of 10 cycles per second. Going further, if the program terminlas M1, M2 are connected to logic 1 (source 32) and logic 0 (source 34), respectively, the programmable divider 30 divides the input signal by 120. This produces one pulse per second in line 40. In the last program position, the program terminals M1, M2 are both connected to logic 1 (source 32). This provides a division by 1 which, in essence, is a bypass around the programmable divider or through the programmable divider. In this mode, there is no frequency conversion operation which means that the input pulses at line 22 are essentially the same as the output pulses in line 40. Of course, there could be an inversion without changing the actual number of pulses flowing through line 40. This last mode of operation is primarily a counting mode so that each pulse is directed to the output line 40 from line 12. By the simple arrangement of changing the connectors 36, 38 between logic 1 and logic 0 the operation of the programmable divider 30 is modified.

Figure 2:
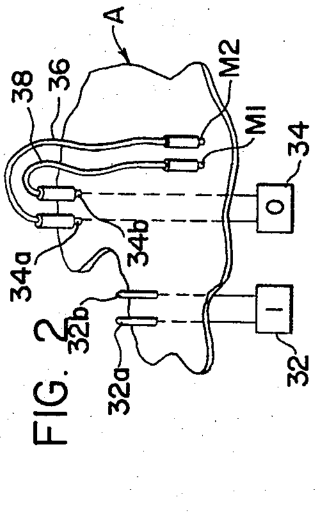
FIG. 2 is a fragmented, enlarged portion showing schematically one aspect of the present invention.

FIG. 2 shows the program terminals M1, M2 as they appear on the actual combined timer/counter unit A. It is noted that the terminals 32*a*, 32*b*, 34*a*, 34*b*, M1 and M2 are all secured juxtapositioned on a portion of the timer housing. The connectors 36, 38 are in the form of flexible electrical conductors which can be moved manually between the respective terminals to code the input applied through program terminals M1, M2 to the internal portion of programmable divider 30. This provides a convenient manner for programming the operation of the timer/counter unit A without requiring external sources of voltage and without requiring complicated adjustments and manipulations to create various modes of opertion. When divider 30 passes a signal having 100 cycles per second, unit A is operating as a timer and the least significant is .01 seconds. In a like manner, when the divider is passing a signal having a frequency of 10 cycles per second, the unit A is operating as a timer, and the least significant digit is 0.1 seconds. Going further, when the divider 30 passes a signal having one pulse per second, unit A is operating as a timer and the least significant digit is 1.0 seconds. In this last mode of operation, if the timer has four digits, it can be modified to read out with the two least significant digits being seconds and the two most significant digits being minutes. This mode of operation would have a range of 99 minutes and 99 seconds. In addition, in a four digit digital timer, an input driving signal of one cycle per second could produce a readout of 9999 seconds. Consequently, it is possible to read in seconds or minutes. This is especially used when the output or driving signal in line 40 is one cycle per second.

The driving signal in line 40 is directed toward a conventional decade binary counter 50, preferably a down counter, which has four separate, divide by 10 stages. To set the desired time or count in the counter 50, there is provided a standard counter set device 54 and an externally readable four digit selector 56. The four digit selector 56 is manually set for the desired time or count. These digits are then set into the decade counter 50 through counter setting device 54 of standard construction. The readout device 52 reads the digital position of each binary counter within decade counter 50. When the readout reaches the number of time set in selector 56, the counter has timed out and the decade counter 50 controls external load device 58 which may be a relay, transistor switching circuit or any other appropriate arrangement. While the counter setting device 54 is programming the decade counter 50, the logic 0 is directed through line 59 to the programmable divider 30 to block operation of the divider. This will be explained later. After the decade counter has been set in a normal manner, a logic 1 appears in line 59.

The operation of the timer counter 50 is self-evident from the above description. By controlling the program terminals M1, M2 and applying a clocking pulse $C_P$ of 60 cycles per second or a random pulse P to be counted, the unit A either times out or measures the desired number of counts for controlling an external load 58 after the desired time or count has been registered by the decade binary counter 50.

Figure 3A:
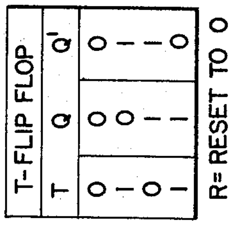
FIG. 3A is a truth table for a T flip flop of the type employed in FIG. 3.
Figure 3:
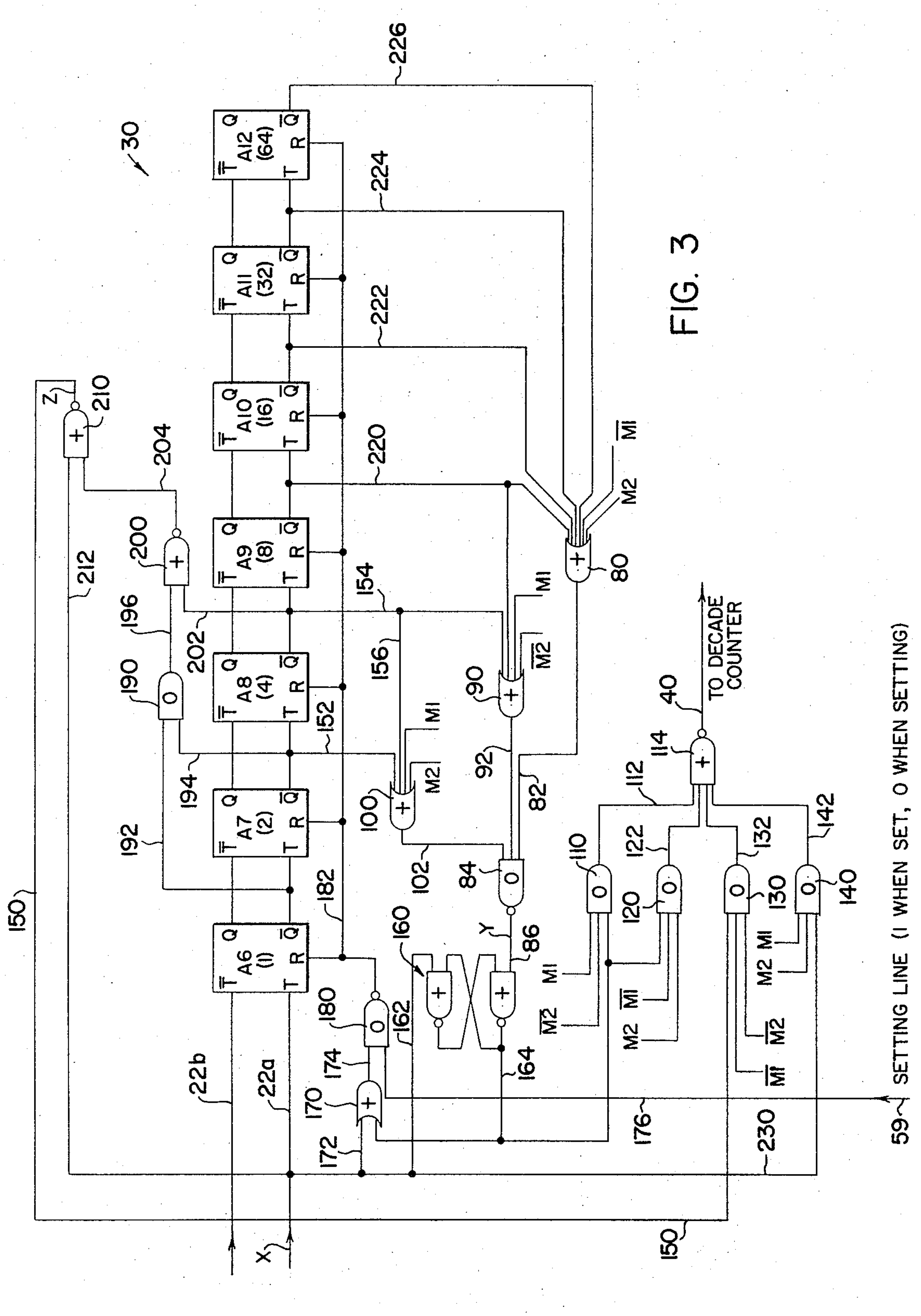
FIG. 3 is a logic diagram illustrating the preferred embodiment of the present invention.

Referring now to FIG. 3, the preferred embodiment of the programmable divider 30 is illustrated. Of course, it is possible to make some modifications in this embodiment without departing from the intended spirit and scope of the present invention. FIG. 3 is a logic diagram having a plurality of standard logic components. A review of the operation of the various components will assist in the understanding of the preferred embodiment.

A T flip flop, of which seven are shown as A6–A12, includes an input T and a primary output Q. An inverse input $\overline{T}$ is provided at the inlet side of the flip flop. In a like manner, an inverse output $\overline{Q}$ is provided at the outlet of the flip flop. The truth table for a T type flip flop is shown in FIG. 3A. It is noted that a logic 1 at the input T changes the condition of the flip flop. A logic 0 has no effect on the flip flop. Each flip flop has a terminal R which is an overriding reset. A logic 1 at this terminal R resets the flip flop to a zero condition. In the truth table of FIG. 3A, Q represents the condition of the flip flop prior to receiving a signal at terminal T. Q' represents the next signal caused by the particular input to the terminal T.

An AND gate is a standard logic wherein there is a logic 1 output whenever there is a logic 1 at each input terminal.

A NAND gate is a standard logic circuit wherein the output is logic 0 when all inputs are logic 1.

An OR gate is a standard logic circuit wherein there is a logic 1 at the output when a logic 1 is present at any or all of the input terminals.

A NOR gate is a standard logic circuit which includes an inverter at the output of an OR gate. This inverter produces a logic 0 at the output of the NOR gate when a logic 1 appears at any or all of the input terminals.

The program terminals M1, M2 have been previously described. In accordance with normal Boolean terminology, $\overline{M1}$ and $\overline{M2}$ are the inverse of M1, M2, respectively. For instance, if M1 is logic 0 in a particular situation, $\overline{M1}$ is logic 1. As previously mentioned, the operation of the divider 30 as shown in FIG. 3 varies according to the coded logic applied to program terminals M1, M2. The most complex operation is performed when both M1 and M2 receive a logic 0. This provides a division by 6/5 to convert the 120 cycles per second input signal in line 22 to a 100 cycles per second driving signal for the decade counter 50. To simply the explanation of the programmable divider 30, it will be first assumed that the programmable divider is programmed to convert an input signal of 120 cycles per second to an output driving signal of 100 cycles per second. In that condition, the program terminals M1, M2 are both logic 0 as shown on truth table 39.

DIVIDE BY 6/5

The reset portion of the logic circuit in FIG. 3 includes three OR gates, at least two of which are latched in any given mode. OR gate 80 has an input $\overline{M1}$ which remains at logic 1. Consequently, the output line 82 of OR gate 80 is latched at logic 1 and does not vary during the operation of the divider 30. The output 1 in line 82 is applied to a NAND gate 84 having an output 86 which is represented by y. Since $\overline{M2}$ is logic 1, OR gate 90 is latched with an output logic 1 in a manner similar to OR gate 80. The output line 92 directs the logic 1 to the NAND gate 84. This NAND gate includes three inputs, two of which are latched to logic 1 during this mode of operation of the divider 30.

OR gate 100 includes two inputs M1, M2. These inputs are both at logic 0; therefore, they do not have a latching function with respect to OR gate 100. This OR gate is operative during the mode of divider 30. output line 102 of the OR gate 100 is directed to the input of NAND gate 84. NAND gate 84 is operative only when the output line 102 carries a logic 1 to the NAND gate. It is now seen that, in the divide by 6/5 mode, only OR gate 100 is active in the group of reset OR gates 80, 90 and 100.

Referring now to the output portion of the divider 30, there is provided a series of programmed AND gates. The first of these gates in AND gate 110 having an input M1, $\overline{M2}$. Since M1 is logic 0, AND gate 110 is latched with a logic 0 output at line 112, which is, in turn connected to NOR gate 114 having output line 40 for the total divider 30. Second AND gate 120 includes inputs $\overline{M1}$ and M2. Since M2 is logic 0, AND gate 120 is latched with a logic 0 output at line 112 which is also connected to the input of NOR gate 114. Third AND gate 130 includes inputs of $\overline{M1}$ and $\overline{M2}$. These inputs are both at logic 1; therefore, AND gate 130 is unlatched and the output in line 132, which is connected to NOR gate 114 will vary according to the signal applied to the other input of gate 130. AND gate 140 has inputs M1, M2, both of which are logic 0. Consequently, AND gate 140 is latched with an output 0 in line 142, which is connected to the input of NOR gate 114. In summary, AND gate 130 controls NOR gate 114 through line 132. When a logic 1 is applied to line 132, the output 40 is logic 0. In a like manner, when a logic 0 is applied to line 132, the output in line 40 is a logic 1. This gives a pulsating output in line 40 corresponding to the pulsations within line 132 between logic 1 and logic 0.

To provide the pulsing signal in line 132, pulses are received by AND gate 130 through input line 150. Since $\overline{M1}$ and $\overline{M2}$ are logic 1, when 150 is at logic 1 line 132 is at logic 1. In a like manner, when input line 150 is at logic 0, line 132 is at logic 0.

The reset function of the programmable divider 30 will now be explained and this explanation will apply generally to resetting the programmable divider 30 when in other modes of operation. Lines 152, 154 are connected to the $\overline{Q}$ terminals of flip flop A7, A8, respectively. These two lines are directed to the input of OR gate 100, the latter being through auxiliary line 156. When the $\overline{Q}$ terminal of either flip flop A7 or flip flop A8 is at logic 1, corresponding to a Q output of logic 0, the OR gate 100 is actuated to produce a logic 1 in line 102. This actuates NAND gate 84 to provide a logic 0 within line 86 and at point y. The logic 0 is directed through line 86 to a standard flip flop 160 having a second input 162 and an output 164. The logic 0 in line 86 produces a logic 1 in line 164 which is directed to an OR gate 170 having a second input 172 and an output 174. Since the logic 1 is now applied to OR gate 170, it is latched to produce a logic 1 in output 174. This logic 1 is applied to NAND gate 180 having a second input 59. This second input is the setting line from the counter setting device 54. It remains at logic 1 when the counter has been set. Consequently, NAND gate 180 receives two logic 1 inputs. This produces a logic 0 output precluding resetting of the several flip flops connected to line 182 forming the output of the NAND gate 180. Consequently, as long as either flip flop A7 or flip flop A8 has a $\overline{Q}$ output of 1, the OR gate 170 precludes resetting.

When the $\overline{Q}$ outputs of both flip flops A7, A8 are at logic 0, the flip flops are reset. This resetting is quite apparent from the logic circuits of FIG. 3. With a logic 0 on lines 152, 156, the output of OR gate 100 is shifted to logic 0 in line 102. This turns off NAND gate 84 to produce a logic 1 in line 86 and at point y. This triggers flip flop 160 to produce a logic 0 in line 164. This logic 0 unlatches OR gate 170 so that the OR gate can be controlled by the second input 172. This second input is connected to the input terminals of the series of flip flops A6-A12. Terminal 22*a* is the actual clocking pulse and terminal 22*b* is the inverse thereof. Consequently, line 172 follows the input clocking pulse of point *x*. After the OR gate 170 is unlatched by receiving a logic 0 through line 164, the output of the OR gate 170 goes to logic 0 when the input 172 goes to logic 0. When logic 0 appears in line 174, the output of NAND gate 180 shifts to logic 1. This resets all of the flip flops A6–A12 to logic 0 at the primary output terminals Q. In summary, when the Q terminals of flip flops A7, A8 are logic 1, which makes the $\overline{Q}$ terminals logic 0, all flip flops are reset to logic 0. By binary coding principles, it will be recognized that this reset occurs when the flip flops have counted to 011 which corresponds to digit 6. Consequently, the reset occurs after the sixth pulse has activated the flip flop set and before the seventh pulse has been received to make the seventh pulse correspond to a first pulse in a counting series. This will be explained later in the general description of the operation of the logic circuit of FIG. 3.

The last component of the logic circuit in FIG. 3 which plays a role in the operation of the programmable divider 30 for producing a divide by 6/5 mode, is the blocking logic circuit which blocks out the sixth pulse in a series of pulses so that only five pulses of every six pass through the programmable divider 30. It will be appreciated that this produces a driving signal for the binary counter 50 having an average frequency of 100 cycles per second when the clocking signal has a frequency of 120 cycles per second. Referring now to the logic circuit to provide this blocking function, this circuit appears generally in the upper portion of FIG. 3 and is reproduced in FIG. 5 with some Boolean terms being applied. An AND gate 190 has a first input 192 connected to the $\overline{Q}$ terminal of flip flop A6 and a second input line 194 connected to the $\overline{Q}$ terminal of flip flop A7. The output 196 of AND gate 190 is connected as an input to NOR gate 200 which has a second input 202 connected to the $\overline{Q}$ terminal of flip flop A8. The output of the NOR gate 200 is line 204 which is connected as a first input to a NOR gate 210. The second input to NOR gate 120 is through line 212 connected to the input 22*a* of the divider 30. If the logic 1 appears in line 204, NOR gate 210 is latched with a logic 0 being applied to the output 150. On the other hand, the NOR gate is unlatched when a logic 0 appears in line 204. In that instance, a logic 1 in line 212 (22*a*) produces a logic 0 in line 150. When a logic 0 appears in line 212 (22*a*), a logic 1 appears in line 150. Consequently, when the NOR gate 210 is unlatched by a logic 0 in line 204, the line 150 is the inverse of the input clocking pulse at line 22*a*, i.e. point *x*. Point *z* is thus the inverse of point *x*. The logic value at *z* passes through line 150 to AND gate 130 where it is inverted by NOR gate 114 and passes from the programmable divider through line 40. Consequently, the output of line 40 corresponds to the input of line 22*a*, except for the removal of one pulse out of every six in a manner to be described.

Figure 5:
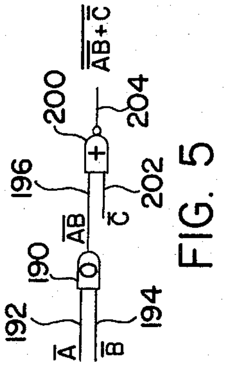
FIG. 5 is a logic diagram of a aportion of the preferred embodiment shown in FIG. 3.
Figures 4, 6, 7:
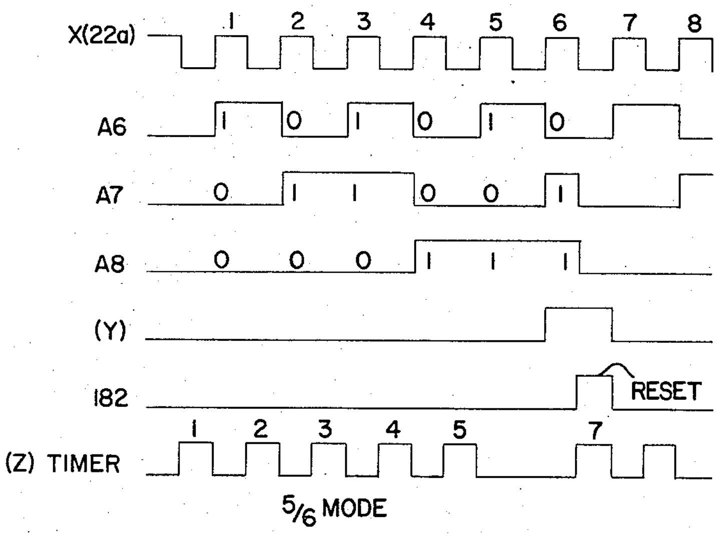
FIG. 4 is a series of wave forms illustrating operating characteristics of a portion of the preferred embodiment shown in FIG. 3.
FIG. 6 is a truth table for the logic diagram portion shown in FIG. 5.
FIG. 7 is a truth table for the binary count of a portion of the logic diagram in FIG. 3 which controls the partial logic diagram of FIG. 5.

Referring to FIGS. 5, 6 and 7 for operation of the blocking circuit in FIG. 3, it is noted that if we assign A as the Q terminal of flip flop A6, B as the Q terminal of flip flop A7 and C as the Q terminal of flip flop A8, the truth table appearing in FIG. 6 and the binary counting table appearing in FIG. 7 will apply to the output of line 204. The output of line 204 is $\overline{AB} + \overline{C}$. This Boolean expression is logic 1 in the three instances appearing at the top of the truth table in FIG. 6. Referring now to FIG. 7, the left hand column is the digital number of pulses being received by the interconnected flip flops A6–A12. At zero pulses, $\overline{A}$, $\overline{B}$ and $\overline{C}$ all equal one. This will produce a zero in line 204 and unlatch the NOR gate 210. As the counts increase it will be noted that when the flip flops have counted digit five the two terminals, i.e. A, B and C, will have a binary code of 101. This gives an inverted binary code at the $\overline{Q}$ terminals of 010 which produces the first logic 1 at the line 204. Consequently, the blocking circuit is activated after the fifth pulse to preclude a sixth pulse in line 150. The fifth pulse has already passed through NOR gate 210 before the flip flops have been shifted into the digit five position.

Referring to FIG. 7, when the sixth pulse shifts the flip flops, a binary number (011) appears on the flip flops. This means that the Q terminals of flip flopss A7, A8, are at logic 1. Thus, the $\overline{Q}$ terminals of these two flip flops are at logic 0. As previously mentioned, this resets the flip flops by unlatching OR gate 170 and allowing the input pulse at line 22a to produce a logic 1 in line 182.

Referring to FIG. 4, the divide by 6/5 mode is illustrated in a series of logic pulse diagrams which are labeled at the left to correspond with the particular point that they appear within FIG. 3. It is clear that the input pulse at point *x* fluctuates between logic 0 and logic 1. The output of NOR gate 210 (point *z*) is the inverse of this. The input clocking pulse is passed through this NOR gate 210 with every sixth pulse being blocked. In other words, five pulses are passed then the next pulse is blocked. It is noted that this circuit does not require complicated multiplication and division circuits to produce the desired 100 cycles per second. In addition, it is not necessary to provide an internal oscillator for producing this desirable and necessary driving signal for the binary counter.

The description of the components utilized when the programmable divider is set to divide by 6/5 or multiply by 5/6, clearly illustrates the operation of the preferred embodiment; however a slight review is appropriate. As pulses are introduced into line 22*a* the flip flops A6, A7 and A8 binary count to five. At that time, the $\overline{Q}$ terminals of these three flip flops are 010. With logic 0 in line 192, AND gate 190 has an output of logic 0. This gives a logic 0 input to NOR gate 200 through line 196. The other input to NOR gate 200 is line 202 which also is at logic 0. With both inputs at logic 0, NOR gate 200 produces a logic 1 in line 204. This blocks NOR gate 210 to produce a logic 0 output in line 150. Up until the fifth count, all pulses were passing through line 150 in an inverse manner to the AND gate 130. They were passed from the AND gate 130 through line 132 to NOR gate 114. This triggered the nOR gate 114 to produce an output in line 40 which was used in the decade counter 50. When the sixth pulse is then applied to the flip flop circuits through line 22*a*, it is blocked from passage through NOR gate 210. This blocks the sixth pulse from the output 40. This sixth pulse, as shown in FIGS. 6 and 7, places the flip flops in a condtion wherein flip flops A7, A8 are both set at 1. The $\overline{Q}$ of these flip flops are then at lotic 0 which produces a logic 0 at the output of OR gate 100. This produces a logic 1 at point *y* to reset all flip flops. Consequently, when the sixth pulse appears at line 22*a*, the flip flops are reset for subsequent operation. Consequently, the output frequency in line 40 is an average frequency of 5/6 the clocking signal, i.e. 100 cycles per second. Of course, there is a slight error introduced by skipping one pulse. However, this error is not accumulative and varies only over five successive pulses and is then rectified when the next six pulses are applied to the input of the divider.

DIVIDE BY 12

When the program terminals are set with M1 being logic 0 and M2 being logic 1, the programmable divider will operate to produce one pulse as every twelve pulses are received from the 120 clocking signal at line 22a. With a programming of the divider with M1 at logic 0 and M2 at logic 1, OR gates 80, 100 are latched to produce a logic 1 output in lines 82, 102, respectively. Since $\overline{M2}$ is logic 0, OR gate 90 is operative in this particular programmed condition of the divider. When either of the $\overline{Q}$ terminals of flip flops A8, A9 is at logic 1, a logic 1 appears at the input of OR gate 90 through line 154 or line 220. This produces a logic 0 at the point y, line 86, which produces a logic 1 at line 164. This blocks resetting of the flip flops and produces a logic 1 input to AND gate 120. The other two inputs to this AND gate are also at logic 1; therefore, a logic 1 appears in line 122. The other AND gates 110, 130, 140 are latched because one of the programmed inputs is logic 0. With a logic 1 in line 122, line 40 produces a logic 0 output. This logic 0 output continues from the divider for eleven input pulses and until the $\overline{Q}$ terminals of flip flops A8, A9 reach 0. This will first occur when binary 0011 (digit 12) has been counted. For the first eleven pulses either line 154 or line 220 has a logic 1. At binary 12, these two lines exhibit a logic 0. When this happens, all inputs to the OR gate 90 are logic 0. This produces a logic 0 at line 92. A logic 1 then appears in line 86 which causes the flip flop 160 to operate. Consequently, a logic 0 appears in line 164. This logic 0 resets the flip flops A6, A12 as previously mentioned upon proper polarization of the input signal at line 172. At the same time, a logic 0 is applied to AND gate 120 which produces a logic 0 in line 122. This, in turn, produces a logic 1 in line 40. This is a single pulse to be counted by the binary counter 50. When the OR gate 170 resets the flip flops, flip flops A8, A9 are reset to 0. This produces a logic 1 at the $\overline{Q}$ terminals of lines 154, 220 to again produce a logic 1 in line 92. This logic 1 shifts the output 40 to logic 0 and awaiting the next logic 0 pulse in line 164 which occurs again at the twelfth counted pulse. This is repeated to produce an output which is one-twelfth of the input, i.e. 10 cycles per second.

DIVIDE BY 120

The programmable divider 30 operates substantially the same in the divide by 120 mode as it did in the divide by 12 mode. Program terminals M1, M2 are connected to logic 1, logic 0, respectively. This latches OR gates 90, 100 and AND gates 120, 130, and 140. OR gate 80 and AND gate 110 are active in this mode of operation. Until the flip flops have counted to binary 120 which is 0001111, there is a logic 1 in one of the lines 220, 222, 224 and 226. This logic 1 maintains a logic 1 in the output line 82 of OR gate 80. In this condition, a logic 0 appears in line 86 (point *y*) and a logic 1 appears in line 164. This latches OR gate 170 and produces a logic 1 in line 112. This produces a logic 0 in line 40. When the flip flops have counted to 120, flip flops A9, A10, A11 and A12 are at 1. This produces a logic 0 at the $\overline{Q}$ terminals so that lines 220, 222, 224 and 226 are at logic 0. OR gate 80 then has a logic 0 output which is directed through line 82 to the NAND gate 84. This produces a logic 1 at line 86 to shift flip flop 160 and produce a logic 0 at line 164. This resets all flip flops and produces a logic 0 in line 112. This in turn produces a logic 1 at line 40 to create a pulse. This pulse appears every time 120 pulses have been received from the clocking signal at line 22*a*.

DIVIDE BY 1

(Counting)

When the unit A is to be used as a counter, it is not desirable to have any division of the incoming signal at line 22, i.e. line 22*a* of FIG. 3. Thus, the unit A is programmed to divide by 1, which only means that each pulse input produces a pulse output to be counted by the binary counter 50. In this mode of operation, the program terminlas M1, M2 are both connected to logic 1. This latches the three reset OR gates 80, 90, 100. This logic in the program terminals also latches AND gates 110, 120, 130. The only active component in the programmable divider shown in FIG. 3 is AND gate 140. This gate is connected by line 230 with line 22*a* forming the input to the divider. When the input is logic 1, the output of AND gate 140 is logic 1. This produces a logic 0 at line 40. When a logic 0 is directed by the input through line 230, the output of AND gate 140 is logic 0 and the output in line 40 is logic 1. Consequently, the output 40 has the same number of pulses as the input at line 22*a* although the pulses are inverted. This provides a counting mode for the unit A.

When the decade counter 50 is being set, a logic 0 appears at line 59. This is connected directly to the AND gate 180 so that it is latched at 1 and all of the flip flops are reset until the binary counter has been properly set for operation.

In the divide by 6/5 mode of the present invention, there is no division or multiplication as such. Only one pulse in six is being blocked. This produces a 100 cycles per second driving signal for the decade counter 50. Since the driving signal has a time base produced by the clocking signal, this mode of operation allows counting in a four digit counter to 99.99 seconds. When the programmable divider is set to divide by 12, the time cycle which can be timed by the unit A will be 999.9 seconds. This produces a timer having a least significant figure of 0.1 seconds. When the divide by 120 mode is employed in the programmable divider, there is a pulse every one second. This produces a range of 9999 seconds. By providing a divide by six in the decase counter and at the second least significant digit, the timing range may be modified to 99 minutes and 99 seconds. Consequently, it is seen that by very easy manual adjustment of the connectors 36, 38 the range of timing of the unit A is adjusted.

The counting mode which is also set by adjusting the connectors 36, 38, best shown in FIG. 2, allows substantially direct bypass around the circuitry of the divider 30 to give a single input pulse to the counter 50 upon receipt of each input pulse to the divider. Of course, various modifications can be made in the combined timer/counter described herein without departing from the intended spirit and scope of the present invention as defined in the following claims. The clocking signal is disclosed as 60 cycles per second; however, the rectified signal of 120 cycles per second is also a clocking signal and, indeed, the signal operated upon by a divider constructed in accordance with the present invention.

Having thus defined my invention I claim:

1. In a timer comprising an input circuit adapted to be connected to a clocking signal having a frequency of substantially 60 cycles per second, a full wave rectifier converting said clocking signal to a pulsing input signal having a frequency of substantially 120 cycles per second, circuit means for changing said input signal into a pulsing driving signal having a train of input pulses, said train of pulses having a preselected time base frequency, a binary counter means for counting said input pulses and including an output means for indicating when a preselected number of input pulses has been counted by said counter means, means for directing said train of input pulses to said counter means, and means for adjusting said preselected number, the improvement comprising: said frequency changing circuit means including circuit means for passing five pulses from each six pulses of said input signal whereby said pulsing driving signal has a time base frequency of 100 cycles per second, said frequency changing circuit includes a second binary counting means driven by said input signal for counting the individual pulses of said input signal from 1 to at least 5, means for creating a counting pulse by a discrete actuation in response to a pulse from said input signal, blocking means responsive to a count of 5 on said second binary counting means for blocking the discrete actuation of said pulse creating means when a sixth pulse of said input signal is applied to said counting pulse creating means and means for resetting said second binary counting means after said blocking means has been actuated.

2. In a timer operated by a clocking signal having a known time base frequency in cycles per second and comprising circuit means for changing said clocking signal into a pulsing driving signal having a train of input pulses, said train of input pulses having a preselected time base frequency, a binary counter means for counting said input pulses and including an output means for indicating when a preselected number of input pulses have been counted by said counter means, means for directing said train of input pulses to said counter means and means for adjusting said preselected number, the improvement comprising: said frequency changing circuit means including a first circuit means for converting said clocking signal into a first train of input pulses having a first preselected average frequency for counting by said counter means and a second circuit means for converting said clocking signal into a second train of input pulses having a second preselected average frequency, selector means for selectively applying said first and second train of input pulses to said counter means, said selector means comprising a frequency selector having a first enabling circuit responsive to a first binary code, a second enabling circuit responsive to a second binary code, means for activating said first circuit means upon actuation of said first enabling means, means for activating said second circuit means upon actuation of said second enabling means, means connected to said selector means and mounted on said timer for selectively creating said first and second codes and means for directing said codes to said selector means for activating one of said first and second circuit means, said means for creating said first and second codes includes at least a set of terminal means on said timer with a first of said terminal means having said first binary code input and a second of said terminal means having said second binary code as an output and a coupling means for selective coupling to one of said first and second terminal means.

3. In a timer operated by a clocking signal having a known time base frequency in cycles per second and comprising circuit means for changing said clocking signal into a pulsing driving signal having a train of input pulses, said train of input pulses having a preselected time base frequency, a binary counter means for counting said input pulses and including an output means for indicating when a preselected number of input pulses have been counted by said counter means, means for directing said train of input pulses to said counter means and means for adjusting said preselected number, the improvement comprising: said frequency changing circuit means having a first frequency converter means for converting said clocking pulse to a first preselected frequency, a second frequency converter means for converting said clocking pulse to a second preselected frequency, and actuation circuit means for actuating said first converter means upon receipt of a first signal and for actuation of said second converter means upon receipt of a second signal, said timer having an internal source of said first and said second signals and a manually programmable means on said timer for selectively directing said first and second signals to said first and said second converter means, respectively, means for connecting said source of first and said second signals to accessible terminal means on said timer, and said programmable means including conductors selectively coupleable with said terminal means.

4. A timer operated by a 60 cycles per second clocking signal, said timer comprising:

a. means for rectifying said clocking signal to produce a 120 cycle per second pulsating input signal;

b. first means for blocking one pulse out of six in said input signal to produce, at an output thereof, a first pulsating driving signal having an average frequency of 100 cycles per second;

c. second means for dividing said input signal by 12 to produce, at an output thereof, a second pulsating driving signal having an average frequency of 10 cycles per second;

d. third means for dividing said input signal by 120 to produce, at an output thereof, a third pulsating driving signal of one cycle per second;

e. means for connecting said timer to a pulsing count signal to be counted;

f. fourth means for passing said pulsing count signal to an output of said fourth means to produce a fourth pulsating driving signal having a frequency matching said pulsing count signal;

g. manual means on said timer for selectively actuating said first, said second, said third and said fourth means;

h. a binary counter means connected to the outputs of said first, said second, said third and said fourth means for counting the pulses of said driving signal; and, i. means for indicating when said binary counter means has counted a preselected number of pulses.

5. A timer operated by a 60 cycle per second clocking signal, said timer comprising:

a. means for rectifying said clocking signal to produce a 120 cycle per second pulsating input signal in the form of a train of repetitive pulses;

a. first binary counter means for counting said pulses;

c. gate means for directing said pulses to said binary counter, said gate means including means for blocking one of said pulses upon receipt of a blocking signal;

d. means for indicating when said first binary counter means has counted a preselected number of said pulses;

e. second binary counting means for counting said pulses to at least five of said pulses;

f. decoding means responsive to said second binary counter means counting five of said pulses for creating a blocking signal causing said gating means to block one of said pulses; and, g. means for resetting said second binary counter means after said one of said pulses and before the next successive one of said pulses in said train of repetitive pulses.

* * * * *